United States Patent

Muecke et al.

[11] 3,880,233
[45] Apr. 29, 1975

[54] WELL SCREEN

[75] Inventors: Thomas W. Muecke; John W. Graham, Houston, both of Tex.

[73] Assignee: Exxon Production Research Company, Houston, Tex.

[22] Filed: July 3, 1974

[21] Appl. No.: 485,479

[52] U.S. Cl. .................... 166/205; 166/296
[51] Int. Cl. .......................... E21b 43/00
[58] Field of Search ............ 166/205, 227, 296

[56] References Cited
UNITED STATES PATENTS

| | | | |
|---|---|---|---|
| 128,126 | 6/1972 | Danforth et al. | 166/296 |
| 128,935 | 7/1972 | Whelpley | 166/205 |
| 1,488,753 | 4/1924 | Kelly | 166/205 |
| 2,335,578 | 11/1943 | Carter | 166/205 |
| 3,057,405 | 10/1962 | Mallinger | 166/205 |

*Primary Examiner*—James A. Leppink
*Attorney, Agent, or Firm*—Robert L. Graham

[57] ABSTRACT

A well screen is provided with a coating of a fusible material for corrosion protection and to prevent screen plugging during storage, handling and placement. The fusible material, preferably wax, is selected for its ability to melt at the normal subsurface temperature of the well. This opens the screen to production, permitting the passage of fluids therethrough.

9 Claims, 2 Drawing Figures

WELL SCREEN

BACKGROUND OF THE INVENTION

1. Field of the Invention

This invention relates to mechanical devices for preventing or retarding the production of sand in wells completed in subterranean formations. In one aspect it relates to an improved screen for use in producing wells.

2. Description of the Prior Art

Sand production in many oil and gas producing areas of the world is a serious problem which costs the industry several million dollars annually, either as a result of repairs or lost production. The recent trend towards higher production allowables and rates has resulted in high pressure differentials across the formations and has increased the severity of sand control problems. If not arrested or controlled, sand entrained in produced fluids can severely erode production equipment and reduce well productivity.

Sand control techniques include the use of mechanical devices to separate the entrained sand at a subsurface location and thereby prevent solids from entering the producing well. These devices normally include a sand screen which itself serves to screen out sand or is used in conjunction with gravel pack completions. In either type of completion, the screen is provided with particularly sized openings to cause sand grains to bridge. In completions which employ a screen without aggregate, the screen openings are sized in relation to formation particles to effect particle bridging. In gravel pack completions, the screen openings are sized in relation to the aggregate used outside the screen; and the aggregate is sized in relation to formation sand. The size relationships of the aggregate and/or screen are normally determined by well-known techniques which are based upon sieve analysis data obtained from formation cores.

Recent studies have shown that the use of techniques based upon the sieve analysis data frequently results in the screen having too large openings. Microscopic examinations of typical cores reveal that particle sizes classified by standard screen sieves are composed of clusters of loosely bound grains as well as individual grains. On the sieve analysis curve, the clusters are classified according to the cluster size instead of individual grain size. However, under producing conditions, the individual grains break away from the cluster and migrate individually.

Because of the inherent errors associated with the conventional sieve analysis technique, there has been a recent trend towards the use of smaller screen openings, both with and without aggregate. Screen openings in the range from about 0.006 and 0.060 inches are normally recommended.

The small openings in such screens present serious problems during storage, handling, and placement because of the tendency of the openings to become plugged. It is well recognized in the art that many completion fluids, particularly bentonitic type fluids or materials containing fluid loss additives, can seriously reduce the flow capacity of screens because of the propensity of such fluids to form filter cake.

Another factor which contributes to poor screen performance is the plugging effects of corrosion during storage and handling. It is not uncommon for screens to be stored for long periods of time in corrosive environments. Corrosion products such as iron oxide can build up and seriously restrict the flow area of openings in fine mesh screens. Corrosion is particularly severe in offshore environments where exposure to the salty air can produce substantial corrosion in a matter of days.

Even more serious, perhaps, is the plugging resulting from mishandling of the screen at the surface. Prior to being run in the well, the screen is normally delivered to the well site and laid on the ground or on the pipe rack where dirt, grease or other foreign matter can become lodged in the openings.

Regardless of the source of the foreign material which plugs the screen openings, it is extremely difficult to remove such materials from fine mesh screens. In many screens which have one or more layers, plugging of the internal flow passages cannot be detected visually, thus an apparently clean screen may in fact be plugged from the buildup of corrosion products or other foreign matter even before the screen is run in the well.

SUMMARY OF THE INVENTION

The purpose of the present invention is to provide an improved well screen having a protective coating which not only prevents plugging by completion fluid during placement operations, but also prevents corrosion during storage and protects against foreign matter during surface handling. The improved mechanical sand control device includes an elongated tubular member (e.g. screen) having a plurality of openings formed therein, and a temporary sealing material for closing such openings, the sealing material being selectively removable at the placement depth in the well. Preferably, the sealant is a fusible, heat-sensitive material having a melting point or softening point below ambient subsurface temperature. Although a variety of heat-sensitive materials such as thermoplastic resins, low melting alloys, and the like may be employed, the preferred sealant is wax. This material is used to completely coat the exterior and interior of the screen thereby protecting the screen against corrosion as well as providing the temporary plugging function. It is also preferred that the wax include a corrosion inhibitor to further increase the shelf life of the screen.

DESCRIPTION OF THE PREFERRED EMBODIMENTS

Figure 2:
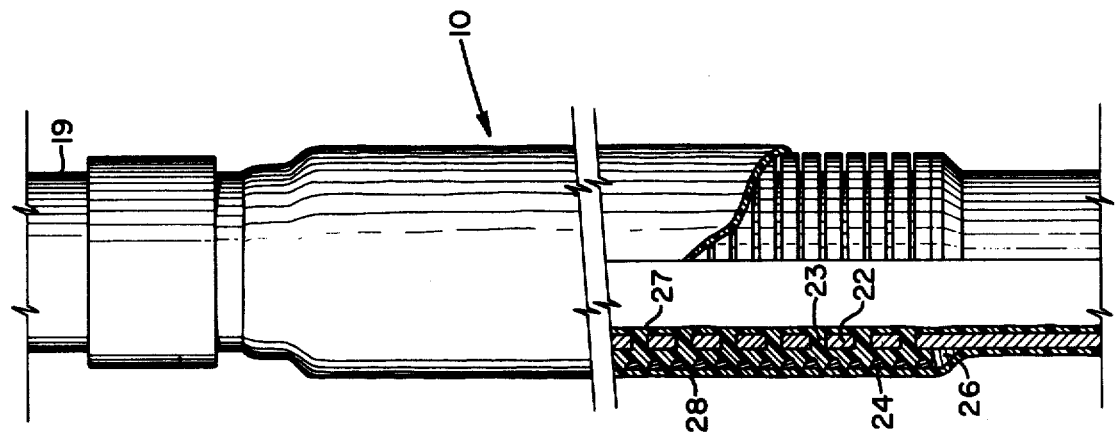
FIG. 2 is an enlarged fragmentary view of a coated screen with portions cut away to illustrate details.

The improved screen of the present invention may be constructed using screens or liners commercially available. The term "screen" as used herein refers to a wide range of tubular goods provided with specially sized openings and designed for use as subsurface filters in wells. Such devices are referred to in the art as "pre-perforated screens", "vertically slotted screens," "horizontally slotted screens," "pre-packed screens," "slotted liners," "wire wrapped screens," and the like. The screens are commercially available in diameters ranging from about 1 in. to about 16 in. O.D. and lengths ranging from about 5 to several hundred feet. The openings in the screens, which range from about 0.006 to 0.60 inches, are sized to screen out or bridge particulate material entrained in produced fluids.

As mentioned previously, important objectives of the present invention are to (a) provide the sand screen with a protective coating to increase the shelf life of the screen and (b) to temporarily seal the screen openings to prevent foreign material from plugging or entering the screen during transit, storage, or handling. For this reason, it is preferred that the sealant used to close the screen openings be applied at the manufacturing plant. The preferred sealants are heat-sensitive; that is, they are solid at surface temperatures but become liquid or semi-liquid at temperatures existing at the setting depth of the screen.

Because of its low cost, availability, ease of application, and low melting point, wax is the preferred sealant. Waxes include esters of fatty acids and monohydric fatty alcohols and can be readily applied to the screen by spray-in techniques or by simply dipping the finished screen in a vat of molten wax. Waxes have a wide range of melting points (between about 85° and about 190°F) and therefore can be selected to fit a wide range of subsurface conditions. Waxes include vegetable waxes such as Japan wax, animal and insect waxes such as beeswax, mineral waxes such as petroleum waxes, and synthetic waxes. Petroleum wax which is available in abundant supply is the preferred wax for use in the present invention.

Thermoplastic resins may also be used as the protective coating and sealant in the present invention. These materials, however, have relatively high melting or softening points so that their application may be more limited than the waxes. Screens coated with the thermoplastic material may be used in special wells such as thermally stimulated wells and deep, high-temperature wells. The preferred thermoplastic resins include low molecular weight polyolefins, e.g. polyethylene and polypropylene.

Also usable in the present invention are the low melting point alloys such as bismuth alloys (Wood's alloy). Bismuth alloys have melting points as low as about 115°F and therefore can be used in relatively low temperature reservoirs.

A preferred technique for applying the heat-sensitive material is by dipping the screen in a molten sealant, e.g. wax, thermoplastic resin, or alloy. Vats of the proper dimensions containing means for maintaining the temperature of the heat-sensitive material above its melting point may be sized to receive individual sections of the screen. Thread protectors may be employed to prevent the molten material from covering the threads.

When using a low melting point alloy it may be preferred to pour the molten alloy between the screen layers of the screen using suitable interior and exterior forms. Such alloy will fill the annular spaces between, and the openings in, the screen layers and will add mechanical strength to the structure.

One technique for applying a petroleum wax coating to a 10-foot section of screen may be as follows: a trough about 12 feet long of sufficient diameter and depth to permit the 10-foot section to be completely immersed therein is provided with heating coils for maintaining petroleum wax at a temperature above its melting point. When coating a screen, it is important that the wax penetrate and fill the openings between screen wires or screen layers. Each screen section is maintained immersed in the molten wax until the wax penetrates between the wires and the screen openings. The screens may be dipped several times to provide the desired coating thickness. The screen section is then elevated permitting excess wax to drain from the screen. Tests have indicated that the dipping technique completely fills the internal spaces of the screen and provides an exterior and interior coating about 100 mils thick. The coating is characterized as relatively smooth, hard, and deformable. Such screens can be handled easily and can be stored for long periods of time in exposed environments.

When the screen is transferred to the well site and laid on the ground or the pipe rack, the wax coating protects it from grease, dirt, dust, or other foreign materials. The wax coating also protects the screen from thread lubricant or grease used in making up screen sections.

Figure 1:
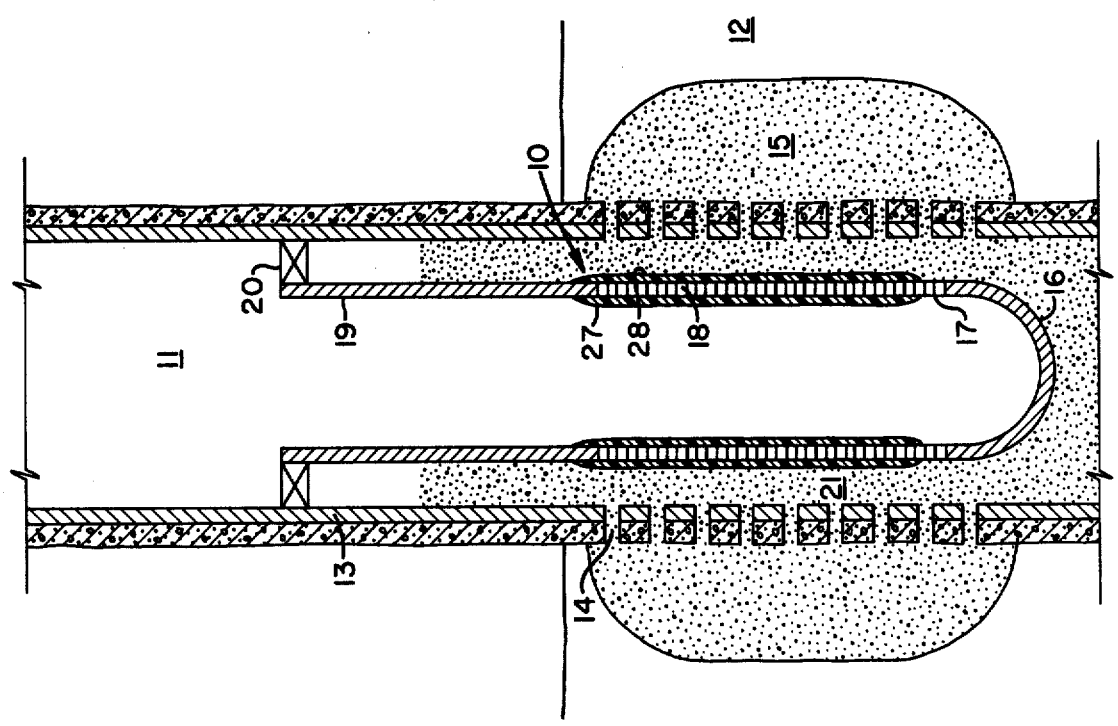
FIG. 1 is a schematic of a gravel pack completion provided with an improved screen constructed according to the present invention, illustrating the screen immediately after being lowered into the well and placement of the aggregate material, but prior to the removal of the screen sealant.

Placement of the screen in the well will be described with reference to FIGS. 1 and 2. As shown in FIG. 1, a screen 10 coated with a fusible material (e.g. wax) is located in a well 11 opposite producing formation 12. The well casing 13 is provided with perforations 14. The formation 12 has been enlarged in the perforated interval and aggregate sized to prevent migration of formation sands has been placed in the cavity providing a filter bed 15 outside the casing 13. Also, aggregate has been placed inside the well in annular space 21 to completely surround the screen 10.

The screen includes a lower shoe 16 and uncoated screen section 17, a coated section 18 and blank section 19. The coated screen 18 is provided with internal and external coating layers 27 and 28. The screen 10 may be run and placed in the wellbore in the position illustrated in FIG. 1 using conventional techniques. In inside gravel packs, the cavity is first formed by washing behind the perforations. Aggregate, suspended in a suitable carrier fluid is pumped through the perforations 14 filling the cavity. The screen 10 is then lowered into the well 11 on the well tubing string which includes a crossover tool. The screen is normally provided with a packer 20 for sealing the screen-casing annulus. A slurry of aggregate and carrier fluid is pumped through the tubing, crossing over to the outside of the screen 10. Aggregate is deposited in annular space 21 as the carrier fluid enters the screen through screen section 17. Sufficient aggregate is placed in this manner until the packed interval is well above screen section 18. The tubing and crossover tool are then withdrawn. FIG. 1 illustrates the equipment at this juncture in the gravel pack operation. Up to this point the carrier fluid maintains the temperature of the screen well below the melting point of the heat-sensitive coating material. However, once pumping operations are stopped, the temperature within the well soon approaches that of the formation 12. The coating material melts or softens, opening the flow passages of screen section 18. The coating material should have a melting point or softening point at least equal to formation temperature and preferably 10°F below the formation temperature. A wax solvent may be circulated through the well to aid in removing the wax coating.

FIG. 2 illustrates a wire screen coated and filled with a fusible material (wax) and corresponds to screen section 18 shown in the assembly of FIG. 1. The screen 10 includes a tube 22 provided with a plurality of slots 23. Wrapped around the tube 22 is a wire mesh layer 24. The individual wires are maintained in spaced relation by spacing lugs (not shown) and the wire layer is secured to the tube by welded connections (one shown as 26).

As can be seen in FIG. 2, the wax fills the spaces between individual wire layers 24 and tube 22, the space between individual wires, as well as providing inner and outer protective coats 27 and 28 on the screen 10.

In another embodiment of the invention, the sealant such as wax is removable primarily by solvent action. Placement of the screen coated with wax may be as described above. Once the aggregate is in place, a hydrocarbon solvent such as toluene or xylene is pumped into the well and permitted to dissolve the wax. The high temperature of the well aids in the dissolving action of the hydrocarbon solvent. The solvency of wax can also be improved by using a hot solvent.

Although the present invention has been described in connection with perforated casing completions using gravel pack, it should be realized that the screen provided with the protective coating can be used in open hole completions with or without aggregate material.

What is claimed is:

1. A subsurface sand control device for use in a well which comprises:
    a screen having a plurality of openings formed therein; and
    a protective coating of a fusible material covering the interior and exterior of said screen for preventing corrosion and temporarily closing said openings thereof for preventing premature plugging during storage and handling, said fusible material having a melting point or softening point equal to or less than the subsurface temperature at which said screen is to be located.

2. A device as defined in claim 1 wherein said fusible material is wax.

3. A device as defined in claim 2 wherein said wax is petroleum wax.

4. A device as defined in claim 1 wherein said fusible material is a bismuth alloy.

5. A device as defined in claim 1 wherein said fusible material is a thermoplastic resin.

6. A device as defined in claim 1 wherein said fusible material has dispersed therein a corrosion inhibitor.

7. A sand control device for use in producing well which comprises:
    a slotted liner;
    a layer of fine mesh wire wrapped around said liner;
    a heat-sensitive material covering the exterior of the wire layer, the interior of said liner, and substantially filling the internal openings and annular spaces of said wire layer and said liner, said heat-sensitive material being solid at surface temperatures and a liquid at the normal subsurface temperature of the setting depth of said device.

8. A sand control device as defined in claim 7 wherein said heat-sensitive material is petroleum wax.

9. A subsurface sand control device for use in a well which comprises:
    a screen having a plurality of flow openings formed therein; and
    a coating of wax covering the interior and exterior of said screen for preventing corrosion and for providing a temporary plug for the screen openings.

* * * * *